(12) United States Patent
Williams et al.

(10) Patent No.: US 9,067,371 B2
(45) Date of Patent: Jun. 30, 2015

(54) WRINKLE CONTROL METHOD AND TOOL THEREFOR

(71) Applicant: AIRBUS OPERATIONS LIMITED, Bristol (GB)

(72) Inventors: Stephen Williams, Ebbw Vale (GB); Timothy Sanderson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/671,809

(22) Filed: Nov. 8, 2012

(65) Prior Publication Data

US 2013/0129526 A1    May 23, 2013

(30) Foreign Application Priority Data

Nov. 23, 2011   (GB) .................................. 1120219.9

(51) Int. Cl.
*B29C 70/30* (2006.01)
*B29C 70/88* (2006.01)
(Continued)

(52) U.S. Cl.
CPC ......... *B29C 70/88* (2013.01); *Y10T 428/24446* (2015.01); *Y10T 156/1002* (2015.01); *Y10T 428/24612* (2015.01); *B29C 70/30* (2013.01); *B29L 2031/001* (2013.01); *B29C 70/56* (2013.01)

(58) Field of Classification Search
CPC ........ B29C 70/56; B29C 70/30; B29C 70/88; B29L 2031/001
USPC ......................................................... 264/258
See application file for complete search history.

(56) References Cited

U.S. PATENT DOCUMENTS 3,349,157 A * 10/1967 Parsons ......................... 264/255
4,946,640 A *  8/1990 Nathoo ......................... 264/316
5,151,277 A *  9/1992 Bernardon et al. .......... 425/112
(Continued)

FOREIGN PATENT DOCUMENTS

DE      10153035 A1    5/2003
EP      2261006 A2   12/2010
(Continued)

OTHER PUBLICATIONS

Extended European Search Report for EP 12 19 2473 completed Feb. 27, 2013.
(Continued)

*Primary Examiner* — Matthew Daniels
(74) *Attorney, Agent, or Firm* — Lowe Hauptman & Ham, LLP

(57) ABSTRACT

A method for forming a laminate component, the method comprising the steps of: a) providing a tool having a molding surface; b) arranging a stack of ply layers on the molding surface of the tool; and c) molding the stack of ply layers over the molding surface in a molding process, wherein the tool has a wrinkle control feature in its molding surface for managing the development of wrinkle in the ply layers during the molding process, and wherein the wrinkle control feature cooperates with the stack of ply layers during the molding process to produce a local surface undulation in a nominal surface of the laminate component nearest the tool to either prevent wrinkling in the ply layers or initiate wrinkling in one or more of the ply layers at a predetermined location. Also, a tool having a wrinkle control feature, and a laminate component so formed.

15 Claims, 8 Drawing Sheets

(51) Int. Cl.
*B29C 70/56* (2006.01)
*B29L 31/00* (2006.01)

(56) References Cited

U.S. PATENT DOCUMENTS

| | | | |
|---|---|---|---|
| 6,114,012 A | 9/2000 | Amaoka et al. | |
| 6,749,784 B2 * | 6/2004 | Blanchon | 264/163 |
| 7,943,076 B1 * | 5/2011 | Hawkins et al. | 264/258 |
| 2001/0045684 A1 | 11/2001 | Blanchon | |
| 2007/0138695 A1 * | 6/2007 | Krogager et al. | 264/259 |
| 2008/0283177 A1 * | 11/2008 | Glain et al. | 156/160 |
| 2009/0065963 A1 | 3/2009 | Coleman et al. | |

FOREIGN PATENT DOCUMENTS

| | | |
|---|---|---|
| JP | 1314139 A | 12/1989 |
| JP | 11058658 A | 3/1999 |

OTHER PUBLICATIONS

Search Report corresponding to GB 1120219.9, dated Feb. 8, 2012.

* cited by examiner section A-A

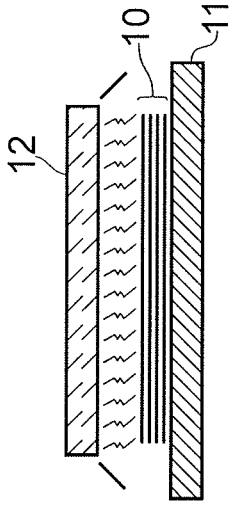
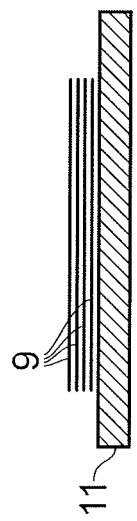
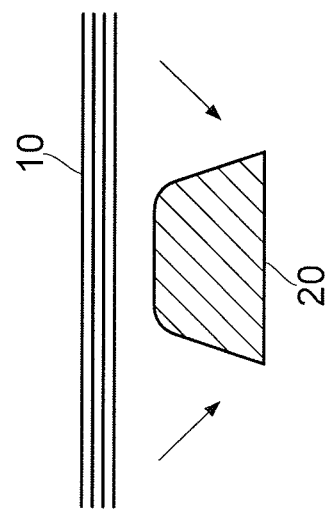
FIG. 3b
FIG. 3e
FIG. 3d
FIG. 3a
FIG. 3c

WRINKLE CONTROL METHOD AND TOOL THEREFOR

RELATED APPLICATIONS

The present application is based on, and claims priority from, British Application Number 1120219.9, filed Nov. 23, 2011, the disclosure of which is hereby incorporated by reference herein in its entirety.

FIELD OF THE INVENTION

The invention relates to a tool for forming a laminate component, a method for forming a laminate component, and a laminate component so formed.

BACKGROUND OF THE INVENTION

Laminate components may be formed by arranging a stack of ply layers on a mould tool, allowing the stack of plies to deform to the shape of the tool and then curing the plies to produce a solid consolidated component. When a laminate stack is folded over a complex three-dimensional moulding surface of the tool, some of the ply layers may be forced to contract or expand depending on the nature of the surface curvature. If the ply layers comprise a material which has minimal ability to contract, for example carbon fibre or Kevlar or glass fibre in a composite material, the geometry may cause wrinkling in the ply layers of the finished laminate component.

Wrinkles in the plies of composite laminate components are undesirable because wrinkles may lead to voids, discontinuities and resin rich or resin poor regions in the component. These defects may result in reduced performance of the component, for example reduced strength and stiffness, and may affect the durability of the component. A composite component having wrinkle in its ply layers may, therefore, perform less well than the intended component according to the design shape of the component without wrinkle.

The development of wrinkle, especially wrinkle affecting external plies of the laminate stack, may also lead to reduced accuracy of surfaces of the component, presenting a particular problem if wrinkle develops on a surface which is designed to engage with other components, and may require concessionary work to be carried out before the finished component can be accepted.

Wrinkle may develop in an unpredictable manner such that, when multiple composite components are formed using the same or similar tools, the components may exhibit different wrinkle characteristics. For example, the extent of wrinkle and the location or locations at which wrinkle develops in each component may vary. This unpredictable nature of wrinkle development leads to non-standard (and therefore time consuming) inspection, correction and justification work, and makes it difficult to produce substantially identical components having predictable features and properties.

For these reasons, it is generally desirable to eliminate or control the development of wrinkle within the laminate stack during the moulding process, so that the shape and properties of the component produced may be optimised and so that multiple components produced to the same design can be made substantially identical.

SUMMARY OF THE INVENTION

A first aspect of the invention provides a tool having a moulding surface for forming a component by laminating a stack of ply layers which are arranged on the moulding surface of the tool during a moulding process, the tool comprising a wrinkle control feature in its moulding surface for managing the development of wrinkle in the ply layers, wherein the wrinkle control feature is arranged to cooperate with the stack of ply layers during the moulding process to produce a local surface undulation in a nominal surface of the laminate component nearest the tool to either prevent wrinkling in the ply layers or initiate wrinkling in one or more of the ply layers at a predetermined location.

A further aspect of the invention provides a method for forming a laminate component, the method comprising the steps of: a) providing a tool having a moulding surface; b) arranging a stack of ply layers on the moulding surface of the tool; and c) moulding the stack of ply layers over the moulding surface in a moulding process, wherein the tool has a wrinkle control feature in its moulding surface for managing the development of wrinkle in the ply layers during the moulding process, and wherein the wrinkle control feature cooperates with the stack of ply layers during the moulding process to produce a local surface undulation in a nominal surface of the laminate component nearest the tool to either prevent wrinkling in the ply layers or initiate wrinkling in one or more of the ply layers at a predetermined location.

The invention is advantageous in that it allows the development of wrinkle during moulding of a laminate component to be controlled. By producing a local surface undulation in a nominal surface of the laminate component nearest the tool, the problems associated with uncontrolled wrinkle in the laminate may be eliminated or at least significantly reduced.

The nominal surface of the laminate component is the design surface of the component. The local surface undulations are known, predictable changes to that design shape that are considered an acceptable result of the manufacturing process. The wrinkle that would otherwise develop due to the shape of the moulding surface of the tool may be either eliminated entirely, or the wrinkle may be reduced or moved into predictable and/or less problematic location, so that the deterioration in performance compared to the intended design shape of the component without wrinkle is reduced or eliminated. The structure and properties of the component are, therefore, more predictable, and so the component may be more accurately analysed, optimised and manufactured.

The ply layers may be fibrous ply layers, for example plies containing fibres of carbon or glass or Kevlar or any other suitable material. The plies may be prepreg plies, or may be dry fibre plies. The fibre plies may be unidirectional, woven, or any other suitable type of fibre plies.

The tool may be used to form a component using any manufacturing process in which a composite component is shaped by interaction with a tool having a moulding surface. For example, the ply layers may be arranged on the tool as a stack of plies or alternatively the individual ply layers may be arranged over the tool sequentially one after the other. In either case the plies may be arranged on the tool manually or in an automated process or in a semi-automated process.

The tool may be a male or female tool. A male tool have a generally convex shape onto which the plies are laid, whereas a female tool has a generally concave shape into which the plies are laid.

The laminate stack may be provided with a removable peel ply layer between structural plies and the moulding surface of the tool during the forming process. The peel ply layer may be removed from the laminate stack when the laminate component and the tool are separated or before the finished component is accepted. Alternatively, the ply layers may be arranged on the tool without a peel ply layer.

The wrinkle control feature may comprise a recess. Alternatively, the wrinkle control feature may comprise a protrusion, or may comprise both a recess and a protrusion. The wrinkle control feature is adapted to provide an increased path length over a region of the moulding surface to accommodate excess material in at least one of the ply layers. By increasing the path length in a region where the ply layers would otherwise be expected to contract more than the material properties will allow, the tendency for these plies to wrinkle will be reduced.

The wrinkle control feature may be adapted to accommodate sufficient excess material in at least one of the ply layers so as to prevent wrinkling of the ply.

The wrinkle control feature may be adapted to initiate wrinkling in at least one of the ply layers at a predetermined location adjacent the wrinkle control feature. Alternatively, the wrinkle initiated by the wrinkle control feature may be at a predetermined location remote from the wrinkle control feature.

The wrinkle control feature may, therefore, be used to prevent or minimise wrinkle in regions of the composite component in which it is particularly desirable to prevent wrinkle from occurring, for example surfaces experiencing particular stress concentrations or surfaces which are designed to engage with other components.

The wrinkle control feature may have a height which varies across its extent.

The wrinkle control feature may have a width which varies across its extent.

The wrinkle control feature may be substantially dart or arrowhead shaped. Alternatively, the wrinkle control feature may be substantially trapezoidal, crescent shaped, elliptical, rectangular, or have any other shape which acts to produce the desired surface undulation in the nominal surface of the laminate component to control wrinkling in the ply layer(s).

The wrinkle control feature may extend to an edge of the moulding surface of the tool. The wrinkle control feature may extend towards a corner of the moulding surface, and may extend up to the corner or only part of the way between an edge of the moulding surface and a corner of the moulding surface. Alternatively, the wrinkle control feature may be located at any position on the moulding surface of the tool in which it can effectively manage the development of wrinkle in the laminate stack.

The wrinkle control feature may have a dimension (e.g. height) that is small, preferably no more than the thickness of 10 individual plies, and preferably less than the thickness of 5 individual plies.

The tool may comprise a plurality of wrinkle control features, and at least some of the wrinkle control features may be adjacent one another.

The moulding surface of the tool may have a complex three-dimensional shape. A complex three-dimensional shape has a cross section which varies in all three dimensions.

The tool may be elongate and have a longitudinal direction, and the shape of the moulding surface may vary in the longitudinal direction. The change in shape may be include a change due to a curve or kink in the longitudinal axis of the tool. The tool may, therefore, be adapted to produce a component having a longitudinal axis and a varying cross section in the direction of its longitudinal axis, or a curve or kink in its longitudinal axis.

The method may be performed repeatedly using the same or a similar tool to produce a plurality of substantially identical laminate components. The components produced may have predictable, uniform wrinkle characteristics so that the variation between the components is less than would be the case if they had been formed using a tool without a wrinkle control feature so that unmanaged wrinkle was allowed to develop in each component.

By producing components which are substantially identical, it is possible to reduce the variation in structure analysis and performance of components formed using the same or similar tools, and to simplify and standardise any necessary inspection, correction and justification work.

The method may be used to form a component having a complex three-dimensional shape. In particular, the component may have an L-section or a C-section. The component may be an aircraft component, and in particular may be a wing spar. The wing spar may have a C-section or two L-sections attached together to form a C-section. Alternatively, a tool or method according to the invention may be used to form any laminate component for use in any other application.

BRIEF DESCRIPTION OF THE DRAWINGS

FIGS. 3a-e illustrate a process for manufacturing a laminate component, which is one of the C-section wing spars;

DETAILED DESCRIPTION OF EMBODIMENT(S)

Figure 1:
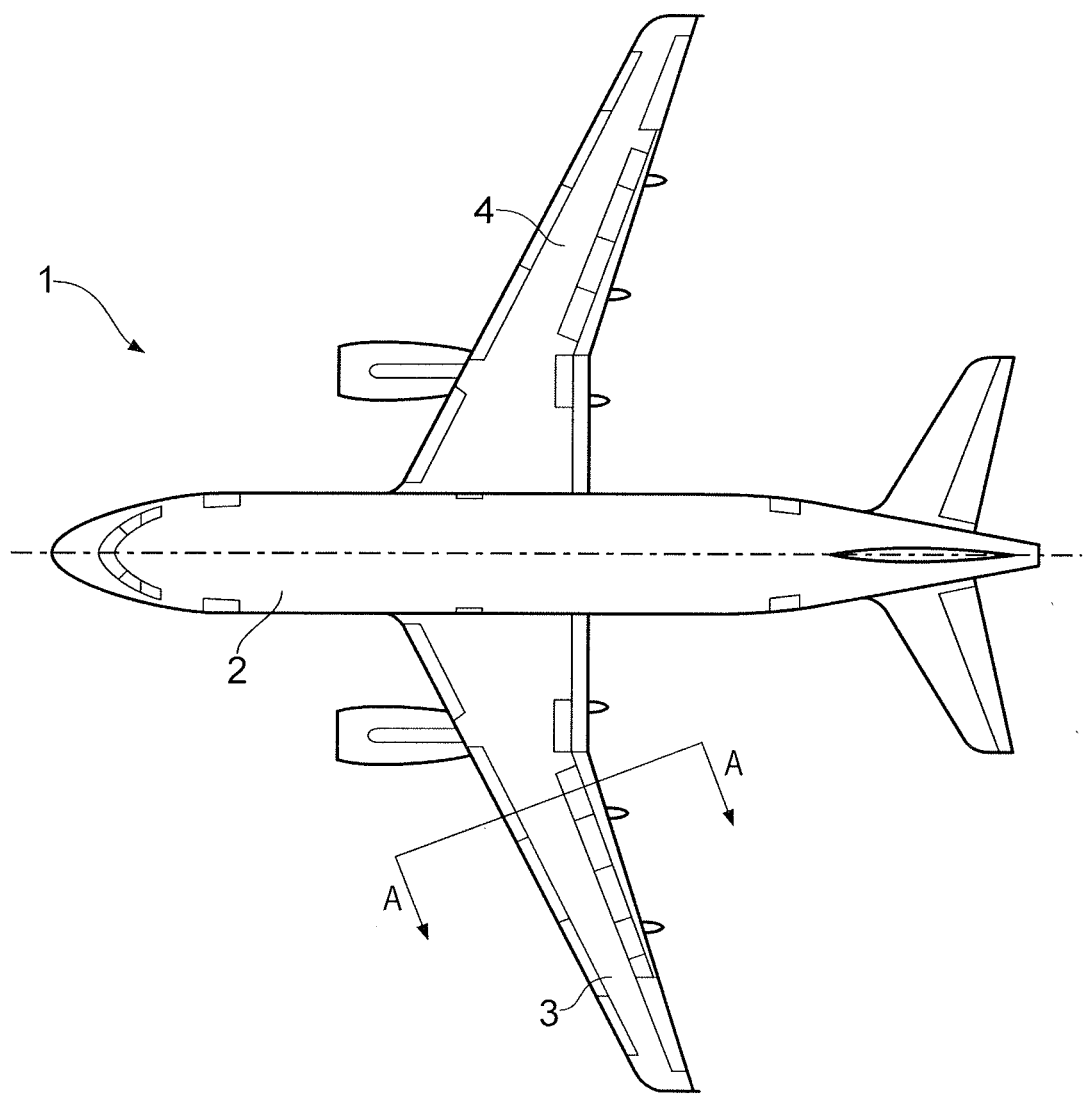
FIG. 1 illustrates a plan view of an aircraft.
Figure 2:
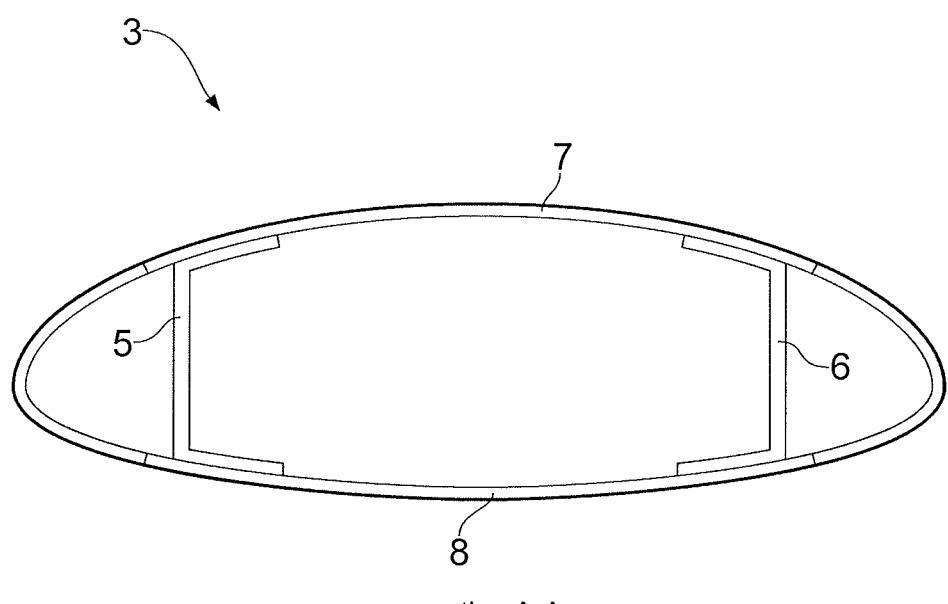
FIG. 2 illustrates a cross section through the aircraft wing along A-A in FIG. 1 showing the front and rear C-section spars.

FIG. 1 illustrates an aircraft 1 having a fuselage 2 and wings 3, 4. The wing 3 has a wing box 4, shown in section A-A through the wing 3 in FIG. 2, comprising a front spar 5, a rear spar 6, an upper wing cover 7 and a lower wing cover 8. The wing covers 7, 8 provide upper and lower aerodynamic surfaces and the spars 5, 6 are composite C-section beams which support the wing covers.

The front spar 5 has a longitudinal axis running span-wise along its length and a cross section which varies along the direction of the longitudinal axis. The spar is formed by a moulding process, as indicated in FIG. 3, by:
  a) laying up multiple fibrous ply layers 9 to form a laminate 10 stack on a lay-up table 11 (FIG. 3a); and
  b) heating the laminate stack with a heating system 12 (FIG. 3b); and
  c) providing a tool 20 (FIG. 3c) having a moulding surface with a controlled shape designed to cooperate with the laminate stack 10 to form the spar 5; and
  d) arranging the laminate stack 10 on the moulding surface of the tool 20 and moulding the laminate stack over the moulding surface of the tool (FIG. 3d); and
  e) curing the laminate stack 10 to produce a solid, consolidated component 10' (FIG. 3e)

The laminate stack 10 has a first surface 10a which is nearest the tool during the moulding process and a second surface 10b which opposes the first surface. The laminate stack 10 may additionally be provided with a removable peel ply layer on its first surface 10a. Alternatively no peel ply layer may be used. The peel ply layer sits between the first surface of the laminate stack 10 and the tool 20 during the moulding process and is removed from the laminate stack 10 before the spar 5 is accepted.

During the moulding process, the first surface 10a cooperates with the moulding surface of the tool 20, and substantially takes the shape of the moulding surface so that the laminate stack assumes the intended shape of the cured component 10'.

Figure 4A:
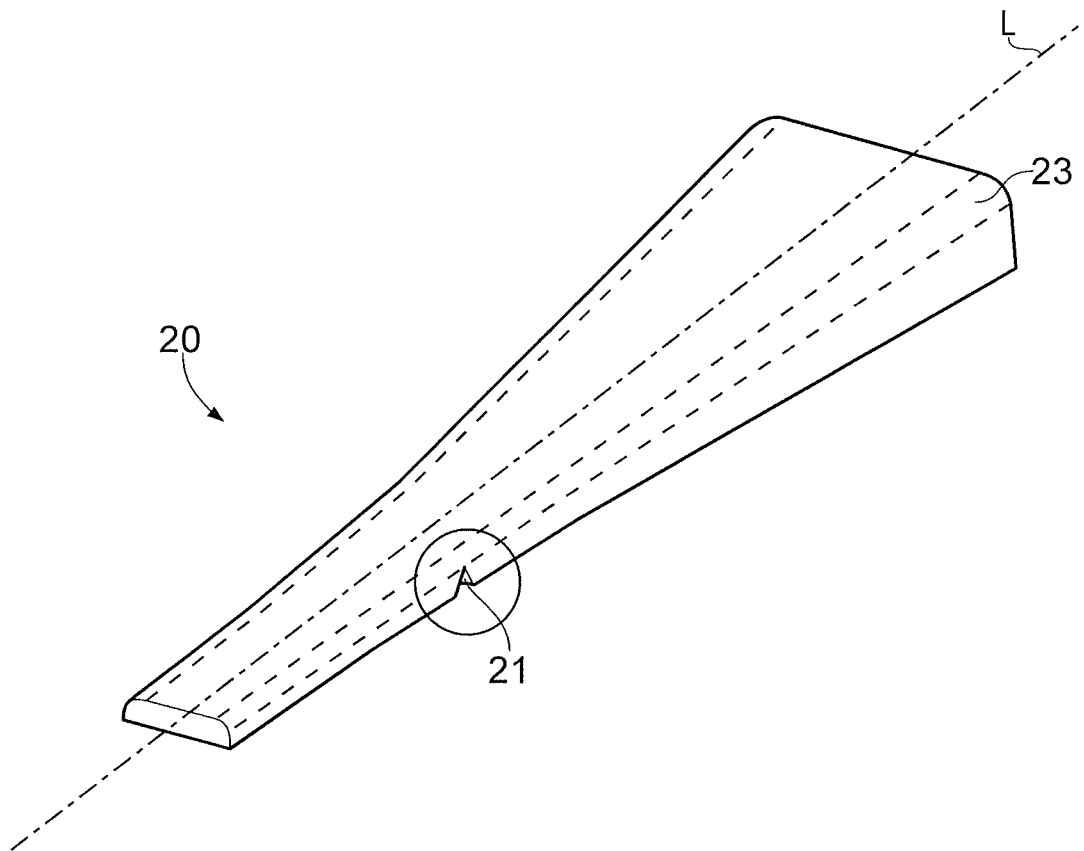
FIG. 4a illustrates the tool used in the process.

The tool 20, shown in FIG. 4a, has a longitudinal axis L and a cross section which varies in the direction of the longitudinal axis, and the spar 5 formed on the tool has a corresponding longitudinal axis and a varying cross section in the direction of its longitudinal axis. The span-wise variation in the height and depth of a spar may be significant, for example the height variation may be well over a meter in large aircraft, and a spar may additionally include a change in direction via a kink or a curve along its length. The three-dimensional design shape of the moulding surface of the tool 20 results in wrinkle developing in the laminate stack 10 when it is arranged on the tool during the moulding process described above, which cannot be eliminated while maintaining a structurally optimised design for the spar 5.

Figure 5A:
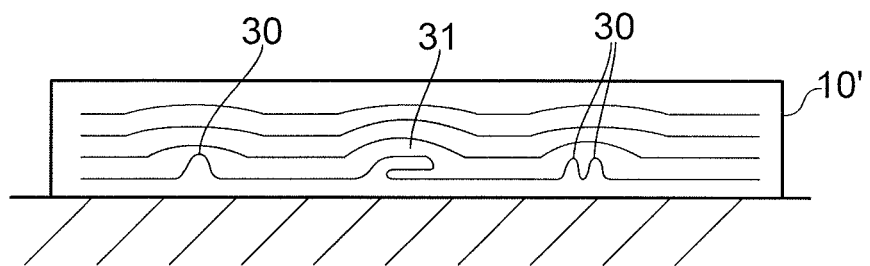
FIG. 5a-c illustrate wrinkle development in laminate stacks.
Figure 5B:
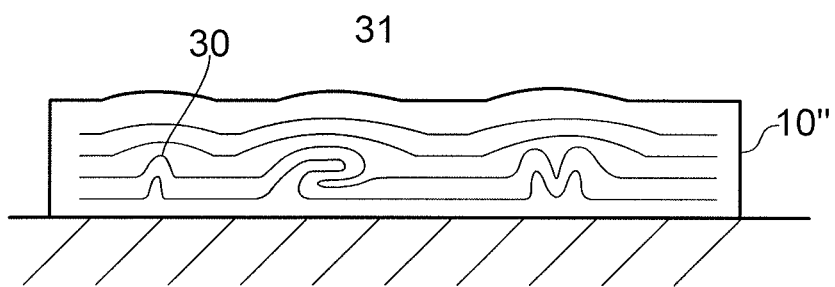
Figure 5C:
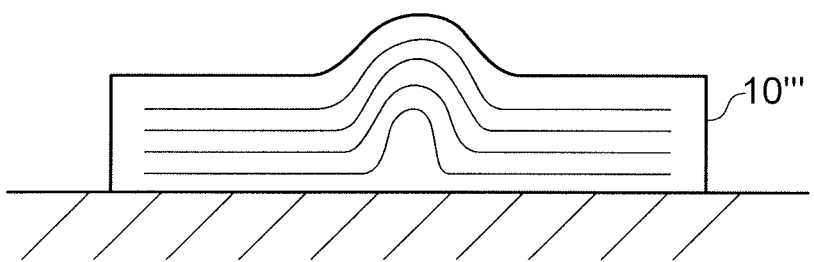

Wrinkle in the ply layers may be in the form of a loop or kink or fold or a combination of these, and may affect one or more ply layers. For example, wrinkle may take the form of a loop (or loops) 30 or fold 31 in an individual ply layer, as indicated in laminate stack 10' in FIG. 5a; or a loop 32 or fold 33 in a plurality of ply layers, as indicated in laminate stack 10" in FIG. 5b; or a loop 34 extending through an entire laminate stack, as indicated in laminate stack 10'" in FIG. 5c. As previously explained in the background section, the uncontrolled development of wrinkle within the laminate stack is disadvantageous because it leads to reduced structural performance, less accurate surfaces, non-uniformity of components and time consuming inspection, correction and justification work.

Figure 4B:
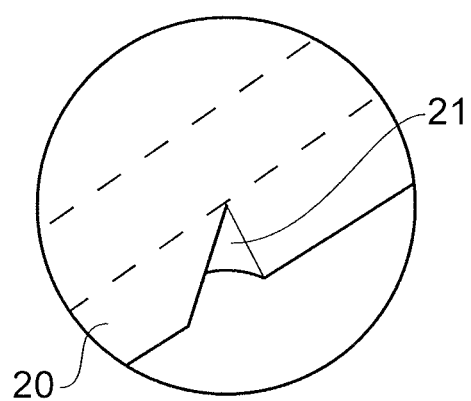
FIG. 4b shows a portion of the tool.
Figure 6A:
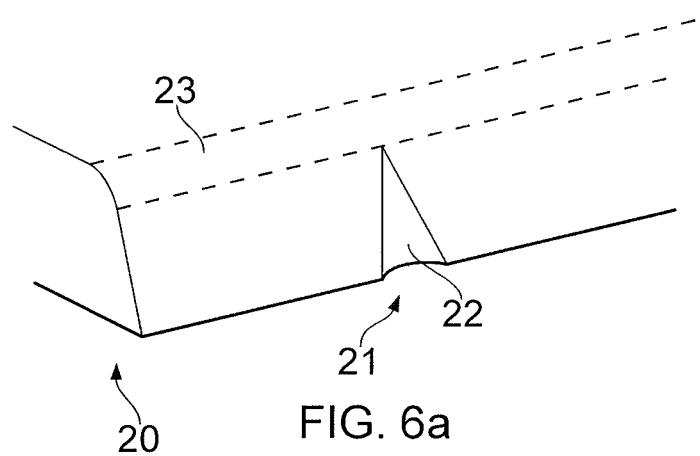
FIG. 6a illustrates a wrinkle control feature in the moulding surface of the tool.
Figure 6B:
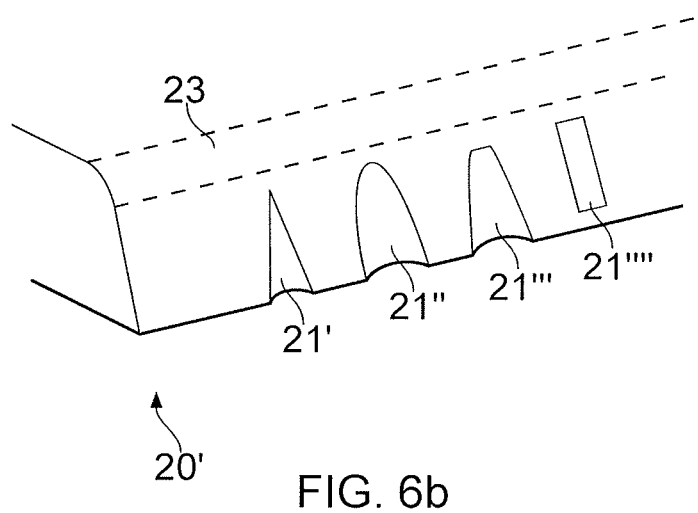
FIG. 6b illustrates a plurality of alternative wrinkle control features.
Figure 7A:
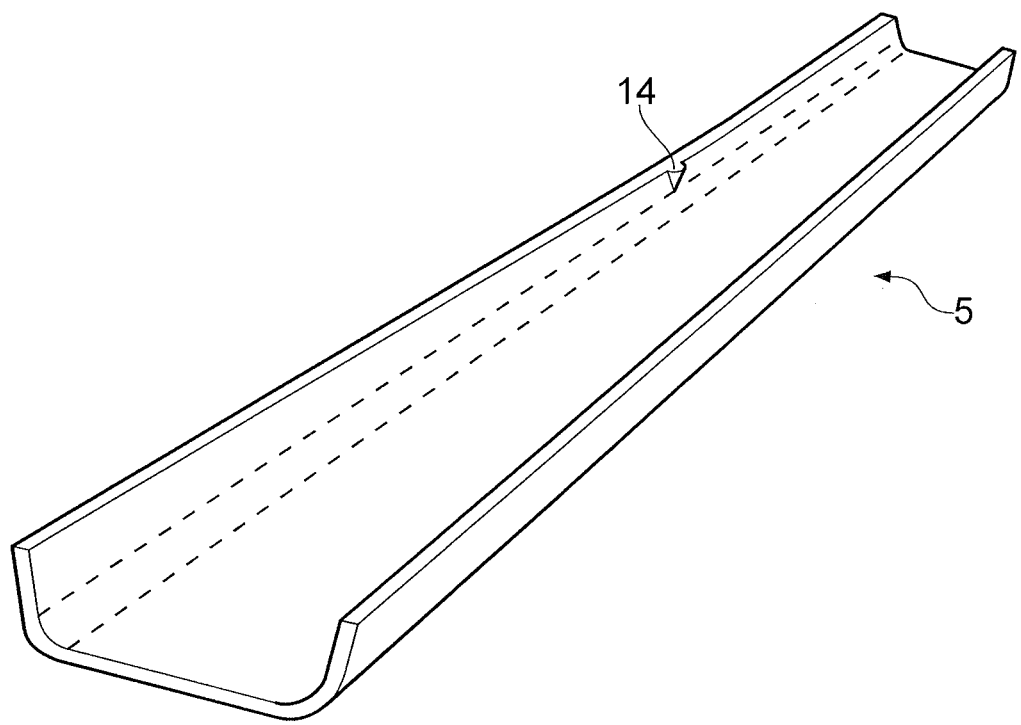
FIG. 7a illustrates a laminate component formed using the tool and having a local surface undulation produced by the wrinkle control feature.

In order to manage the development of wrinkle within the laminate stack 10 during the moulding process, the tool 20 is provided with a wrinkle control feature 21 on its moulding surface, as shown in FIG. 6 and FIG. 4b. The wrinkle control feature 21 is adapted to cooperate with the first surface 10a of the laminate stack to produce a predictable surface feature 14 (a local surface undulation in the nominal surface of the cured component) in the first surface, shown in FIG. 7a and FIG. 7b. The development of the surface feature acts to minimise the impact of wrinkle on the second surface 10b, and to reduce uncontrolled wrinkle developing at the first surface. The wrinkle control feature is also adapted to minimise its own effect on the optimisation of the design shape of the component, and to minimise its own effect and that of the wrinkle on the shape of the second surface 10b.

The wrinkle control feature 21 is a recess 22 which cooperates with the laminate stack during the moulding process, and is adapted to accommodate excess material from the laminate stack. As can be seen from FIG. 6, the width and height of the wrinkle control feature varies across its extent, and the recess is a substantially dart or arrowhead shaped indentation extending from adjacent an edge of the moulding surface of the tool 20 towards a corner 23 of the tool. The arrow head shaped recess 22 tapers in dimensions towards the corner 23. The recess may extend to the corner 23 or may alternatively extend part of the way from the edge of the moulding surface towards the corner as required.

In alternative embodiment, the wrinkle control feature may not be arrowhead shaped but may be some other shape. Several alternative shapes for wrinkle control features 21', 21", 21'" and 21"" are shown adjacent each other on a tool 20' in FIG. 6b. Wrinkle control feature 21' is arrow head shaped and extends part of the way from the edge of the moulding surface of the tool 20' to the corner 23. Wrinkle control feature 21" is generally elliptical and has curved sides and a curved tip. Wrinkle control feature 21'" is trapezoidal and has a flat tip. Wrinkle control feature 21"" is rectangular in shape. The alternative wrinkle control feature designs of 6b are just some of the possible alternative designs to the arrow head shaped feature previously described and are given as non-limiting examples.

The optimum geometry and location of the wrinkle control feature in a function of the shape of the moulding surface of the tool and the materials used to form the component. The optimum type, shape, dimensions and location of a wrinkle control feature may, therefore, vary significantly depending on the component being formed. For each specific component design, the optimum wrinkle control feature geometry and location may be determined by simulation or by trial and error. In this way, the wrinkle control feature may be optimised separately for each application to achieve the most effective control of the development of wrinkle across a range of composite components.

When the laminate stack 10 is arranged on the tool 20, as shown in FIG. 3d, and the laminate stack 10 conforms around corner 23, some regions of the laminate stack experience a contraction due to the complex, 3-dimensional nature of the tool.

Because the fibrous ply layers 9 have minimal ability to contract, the ply layers tend to buckle and form wrinkles initiated by the wrinkle control feature 21 adjacent the first surface 10a.

Figure 7B:
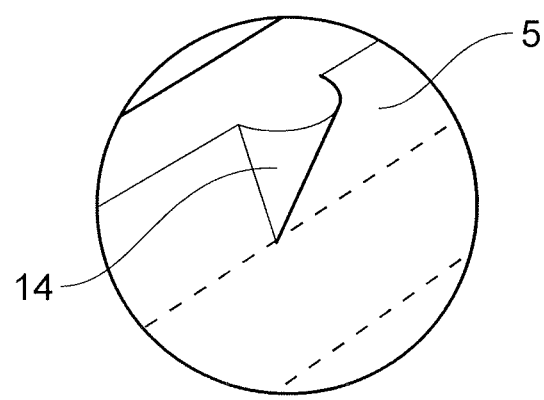
FIG. 7b shows a portion of the laminate component.

Excess material from some of the ply layers 9 at or near the first surface 10a is received by the recess 22, so that a controlled surface feature 14 is generated at the first surface, as shown in FIG. 7b. The surface feature 14 is a predictable wrinkle which is initiated at a predictable location defined by the wrinkle control feature 21. The induced wrinkle may be contained entirely within the recess 22, or extend out from the wrinkle control feature 21 at which it is induced.

In an alternative embodiment, instead of inducing a wrinkle, the wrinkle control feature 21 may be adapted to provide an increased path length over a region of the moulding surface for at least one of the ply layers adjacent the first surface sufficient to prevent wrinkle altogether. In this case, when the ply layers 9 adjacent the first surface 10a begin to contract, the additional path length provided on the moulding surface of the tool 20 accommodates the excess material in the ply layers adjacent the first surface to reduce or prevent wrinkle.

By accommodating excess material from one or more ply layers adjacent the first surface 10a and forming a surface feature or induced wrinkle at or near the wrinkle control feature 21 provided on the tool 20, the wrinkle control feature acts to prevent or reduce wrinkle in the laminate stack 10 in regions remote from the wrinkle control feature. In this way, the extent and location of wrinkle within the component 10' may be managed. The management of wrinkle includes reducing the extent of wrinkle and controlling its location so that wrinkle can be reduced or prevented in regions in which it is particularly desirable to achieve an accurate, predetermined surface, for example datum surfaces of the spar 5 for mounting other components including upper and lower wing covers 7, 8 and ribs.

The tool 20 may be used to form a plurality of spars 5. Each of the spars 5 has a predictable surface feature 14 produced by the wrinkle control feature 21, and the surface features of the spars 5 are all substantially identical. In addition, the generation of the surface features 14 acts to manage the development of wrinkle in the laminate stacks of spars 5 as each of the spars are formed, so that the spars each benefit from the positive effects of managing wrinkle as described above. Because the managed development of wrinkle in the spars 5 is predictable, the spars are more similar to each other than a group of spars formed on an equivalent tool without a wrinkle control feature, which would experience un-managed and unpredictable wrinkle. In this way, the invention also enables a plurality of spars 5 to be formed having minimal variation between the spars.

Figure 8A:
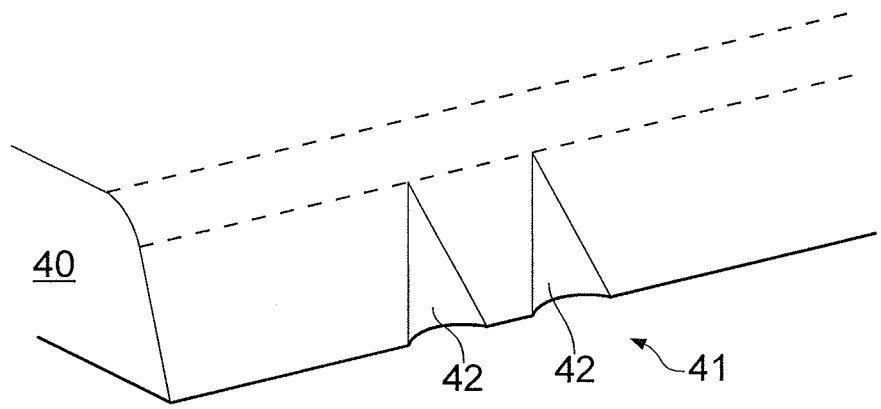
FIG. 8a-c illustrates alternative arrangements of wrinkle control features.

In an alternative embodiment, a tool 40 for forming a spar which is substantially similar to the spar 5 previously described may be provided with a wrinkle control feature 41 comprising two recesses 42 adjacent each other, as shown in FIG. 8a. The multiple adjacent recesses of such an arrangement act similarly to the wrinkle control feature previously described but produce a plurality of surface features and therefore more extensive local surface undulation with respect to the nominal surface of the laminate component. By using multiple recesses, the amount of excess material accommodated by the wrinkle control feature may be increased, or the required extent of each of the recesses may be reduced. By using multiple, smaller recesses 42 in the place of the single larger recess 22 previously discussed, the effect of the wrinkle control feature of the shape of the spar 5 is minimised, because the extent of the surface features produced is reduced.

Figure 8B:
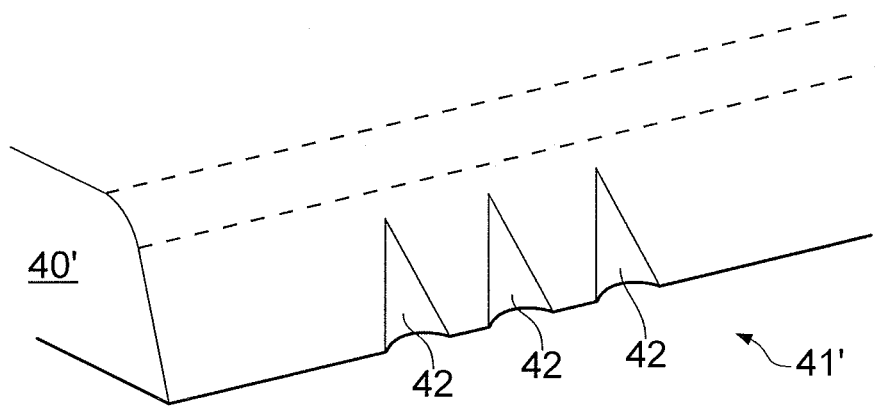

In an alternative embodiment, a tool 40' for forming a spar which is substantially similar to the spar 5 previously described may be provided with a wrinkle control feature 41' comprising more than two recesses 42 adjacent each other, as shown in FIG. 8b, providing similar benefits to the embodiment shown in FIG. 8a.

Figure 8C:
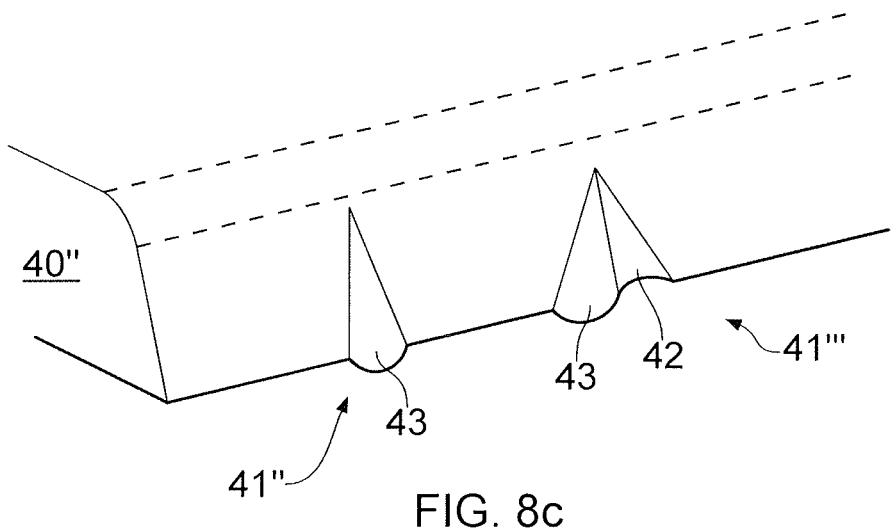

In an alternative embodiment, a tool 40" for forming a spar which is substantially similar to the spar 5 previously described may be provided with a wrinkle control feature 41" comprising a protrusion 43 or a control feature 41''' comprising a protrusion and 43 and a recess 42, as shown in FIG. 8c. The protrusion 43 acts to initiate a predictable, controlled wrinkle at a location defined by the wrinkle control feature 41' which acts to manage the development of wrinkle in the laminate stack of the spar.

Rear spar 6 may equally be formed using a tool having a wrinkle control feature or wrinkle control features as described above. Rear spar 6 may, like spar 5, be a straight spar, or alternatively may comprise a kink or bend.

Any number of wrinkle control features, each comprising a recess or recesses and/or a protrusion or protrusions may be provided on the tool.

In the embodiments described above, the wrinkle control feature is provided on the moulding surface of a male tool. However, in another embodiment, a wrinkle control feature may be provided on the moulding surface of a female tool. A wrinkle control feature provided on a female tool may be adapted to control the development of wrinkle in the same way as any of the embodiments already described.

In the embodiments described above, the ply layers are laid up to form a ply stack which is then arranged on the tool. However, in another embodiment, the ply layers may be arranged on the tool sequentially, so that the ply stack is assembled on the tool. The laminate stack or individual ply layers may be arranged on the tool by hand or in an automated or semi-automated process.

Although the invention has been described above with reference to one or more preferred embodiments, it will be appreciated that various changes or modifications may be made without departing from the scope of the invention as defined in the appended claims.

The invention claimed is:

1. A method for forming a composite spar comprising:
   a) providing an elongate tool having a moulding surface comprising an edge and a corner and a recess and/or protrusion wrinkle control feature in the moulding surface extending from the edge and tapering toward the corner;
   b) arranging a stack of ply layers on the moulding surface of the tool;
   c) moulding the stack of ply layers over the moulding surface in a moulding process; and
   d) curing the stack of ply layers to form a composite spar;
   wherein the wrinkle control feature cooperates with the stack of ply layers during the moulding process to produce a local surface undulation only in the surface of the stack of ply layers moulded against the moulding surface that either prevents wrinkling in the ply layers or initiates wrinkling in one or more of the ply layers at a predetermined location.

2. A method according to claim 1 wherein the wrinkle control feature comprises a recess extending into the moulding surface of the tool.

3. A method according to claim 1 wherein the wrinkle control feature comprises a protrusion extending out from the moulding surface of the tool.

4. A method according to claim 1 wherein the wrinkle control feature provides an increased path length over a region of the moulding surface which accommodates excess material in at least one of the ply layers.

5. A method according to claim 1 wherein the wrinkle control feature accommodates sufficient excess material in at least one of the ply layers so as to prevent wrinkling of the ply.

6. A method according to claim 1 wherein the wrinkle control feature has a height which varies across its extent.

7. A method according to claim 1 wherein the wrinkle control feature is substantially dart or arrowhead shaped.

8. A method according to claim 1 comprising a plurality of wrinkle control features.

9. A method according to claim 8 wherein at least some of the wrinkle control features are adjacent one another.

10. A method according to claim 1 wherein the moulding surface has a complex three-dimensional shape.

11. A method according to claim 1 wherein the tool is elongate and has a longitudinal direction, and the shape of the moulding surface varies in the longitudinal direction.

12. A method according to claim 1 wherein the composite spar has a complex three dimensional shape.

13. A method according to claim 1 wherein the composite spar has an L-section or a C-section.

14. A method according to claim 1 wherein the composite spar is an aircraft component.

15. A method according to claim 1 wherein the aircraft component is a wing spar.

* * * * *